United States Patent [19]

Timm

[11] 4,263,628
[45] Apr. 21, 1981

[54] MAGNETIC TRANSDUCING TAPE TRANSPORT SYSTEM

[75] Inventor: Horst Timm, Hildesheim, Fed. Rep. of Germany

[73] Assignee: Blaupunkt-Werke GmbH, Hildesheim, Fed. Rep. of Germany

[21] Appl. No.: 52,343

[22] Filed: Jun. 27, 1979

[30] Foreign Application Priority Data

Jul. 17, 1978 [DE] Fed. Rep. of Germany ....... 2831281

[51] Int. Cl.³ ........................ G11B 5/48; G11B 15/22; G11B 23/04
[52] U.S. Cl. .................................. 360/96.3; 242/199; 242/192; 360/104
[58] Field of Search ....................... 360/96.3, 96.1, 93, 360/71, 130.2, 83, 90, 104, 105; 242/199–202, 192, 210, 204, 75.4

[56] References Cited

U.S. PATENT DOCUMENTS

| | | | |
|---|---|---|---|
| 3,650,495 | 3/1972 | Boyer | 242/199 |
| 3,656,705 | 4/1972 | Boyer | 242/199 |
| 3,667,762 | 6/1972 | Scheid | 360/90 |

*Primary Examiner*—Alfred H. Eddleman

*Attorney, Agent, or Firm*—Frishauf, Holtz, Goodman & Woodward

[57] ABSTRACT

To provide an efficient and easily handled cassette or cartridge for magnetic tape particularly suitable for longitudinal track video recording, a wind-up reel and a pay-out reel are located adjacent each other in an essentially rectangular cassette arrangement, with the tape passing diagonally between the reels so that the reels will rotate in opposite direction when in operation, the reels being engaged by friction rollers which are connected to dynamo electric machines, one of them operating as a drive motor and the other as a dynamic brake; the drive or retardation rollers, respectively, are supported by parallel-link arrangements in which one of the parallel portions of the link also carries the transducer head for essentially perpendicular engagement of the transducer head with the tape, the transducer head and the associated roller being movable in essentially radial direction with respect to the associated winding. The tape is locked in the cartridge, when not in use, by a brake plate, bearing against an end face of the center reel supporting the winding under spring pressure, the brake plate being lifted off its seat with the reels by a plunger operated by the transducing apparatus.

17 Claims, 5 Drawing Figures

4,263,628

MAGNETIC TRANSDUCING TAPE TRANSPORT SYSTEM

The present invention relates to a magnetic tape recording/reproducing system, and more particularly to a transport arrangement in which the tape can be contained in a cassette, the system being particularly applicable to video recording tape for magnetic recording and reproduction of television signals in which the signals are recorded in longitudinal tracks.

BACKGROUND AND PRIOR ART

Various types of tape transport systems, particularly for cartridge-loaded tapes, have been proposed. German published patent application DE-AS No. 23 50 816 shows a magnetic tape transport arrangement for a transducing system in which a pay-out reel and a wind-up or take-up reel for a magnetic transducing tape are located adjacent each other and pressed against a common drive roller. Since the diameter of the winding of the tape changes as tape is transported from the pay-out to the take-up reel, the position of the center of rotation of the respective reels with respect to the drive roller changes in radial direction.

Information transducing systems, that is, information recording and reproduction systems having tape transport arrangements of this type have some disadvantages. For example, care must be taken when exchanging one tape reel or winding for another since, otherwise, the tape may be damaged. Systems of this type are poorly suited for storage of the tape in cassettes or cartridges so that tape on reels has to be handled with consequent possibility of tape spillage upon unskilled or careless handling.

THE INVENTION

It is an object to provide a tape transducing apparatus and system which permits interchange of tape reels or windings in a simple manner and which also lends itself to storage of the tapes in cassettes, and insertion of the tape cassettes into the apparatus.

Briefly, the tape is transported between a pair of reels which are located spaced from each other. The tape is guided in a diagonal direction with respect to a tangential line connecting the surfaces, or circumferences of the respective reels. The reels rotate in opposite directions of rotation. The wind-up reel and the pay-out reel rotate oppositely, under the tension force of the tape being wound on the take-up reel, as driven by a drive roller. A magnetic transducing head is located between the take-up and wind-up reel in the diagonal path of the tape between the respective reels, and positioned essentially perpendicularly to the direction of travel of the tape between the two windings.

In a preferred form, a drive roller, driven by a drive motor, is pressed against the tape in the region of the take-up winding. To provide for appropriate tape tension, a motor, which can function as a drive motor upon reversal of the tape for the tape then operating as a pay-out winding, is operated as a dynamic brake, that is, as a generator feeding its output into a dissipating resistor. In operation, both motors, one of which then will function as a generator, are engaged with the respective windings to provide the necessary drive for the tape and tension as the tape passes the magnetic transducing head. The arrangement can be constructed inspace-saving manner by engaging the tape by the respective dynamo electric machines functioning, respectively, as a motor and as a brake generator, at opposite sides of the tape. Drive of the take-up winding can be direct from the dynamo electric machine functioning as a motor.

Both the dynamo electric machine and the associated drive roller in engagement with the tape preferably are secured by a movable support to the frame of the transport and transducing system or apparatus, to be radially movable with respect to the center of rotation of the respective associated winding. The movable support of the respective drive roller also permits disengagement of the drive roller from the tape, or the winding, respectively, to facilitate exchange of the tape, for example held in a cassette or cartridge, without essential disturbance of the system. Both the respective roller and magnetic head are supported in a parallel-linkage arrangement, to provide for reliable and accurate information transfer between the magnetic recording markings on the tape and the transducing head. The respective tape reels or tape windings are held on reel holders which, preferably, have a conical seat fitting with a conical engagement seat on a shaft which is part of the transducing apparatus or system to ensure accurate centering and true running of the tape and the respective reels and windings. The tape itself can be held in the cassette by a brake plate, spring-loaded to press against the end surface of the accumulated winding roll and supported from a cassette housing surface, the brake plate being lifted off the tape by a push rod which becomes operative when the mechanism is started, to permit free running of the tape in operation, but holding of the tape in the respectively stopped position when the tape in its cassette is removed from the transducing apparatus or merely when the apparatus is stopped. The cassette, preferably, is formed with suitable openings to permit engagement of the drive rollers coupled to the respective dynamo electric machine, the cassette housing being formed with movable cover flaps to protect the tape against dirt, dust, and contamination when not associated with a transducing apparatus.

The system and apparatus has the specific advantage that the tape can be easily exchanged with other tapes to be associated with the apparatus, can be readily stored in a cassette, and removed and reinserted in the apparatus at random positions which can be predetermined, that is, to transduce specific portions of information on the tape, regardless of where located along the length thereof.

DRAWINGS

Illustrating a preferred example:

Figure 1:
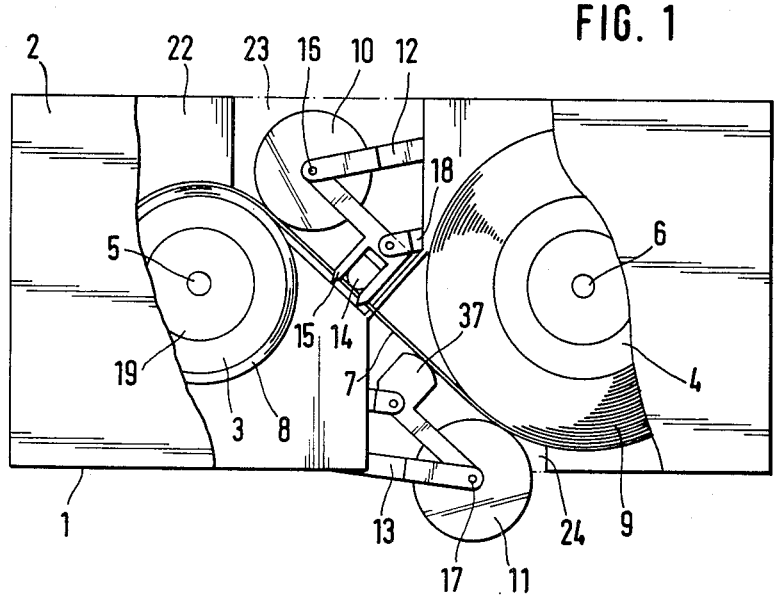
FIG. 1 is a highly schematic top view of a cassette, inserted in the apparatus, with the top of the cassette partly broken away, and showing only those portions within the windings necessary for an understanding of the present invention.

A cassette 1 (FIGS. 1, 4) has a top cover plate 2 within which two tape reels 3, 4 are located. For purposes of this illustration, reel 3 is deemed to be the take-up reel, reel 4 the pay-out reel. The reproducing-/recording apparatus has two drive rollers 10, 11, each coupled to a dynamo electric machine, in which the machine of roller 10 will be electrically connected or switched for connection as a drive motor of essentially constant speed, as well known in connection with drive for magnetic transducing tape, and the dynamo electric machine of roller 11 will be connected to operate as a generator loaded by a dissipating resistor so that it will function as a brake for the tape being paid out, thus providing for tension of tape 7 as it runs from the pay-out reel 4 to the take-up reel 3.

The take-up reel 3 and the pay-out reel 4 are rotatable about axes 5, 6 which are geometrically predetermined. The windings rotate in opposite direction of rotation, the tape 7 being tensioned by the braking effort of the machine coupled to roller 11, and running essentially diagonally with respect to the circumferences of the respective reels from the pay-out winding 9 to the take-up winding 8 of the take-up reel 3.

The drive roller 10 and the braking roller 11, coupled to the respective dynamo electric machines, are pressed against the tape 7 at opposite sides thereof. Drive roller 10 is pressed against the winding 8 of the take-up reel 3; drive roller 11 is pressed against the pay-out winding 9 of the pay-out reel 4. Of the respective dynamo electrical machines driving the respective rollers 10, 11, only machine 30 (FIG. 3) coupled directly to the roller 10 is shown, in this embodiment functioning as a drive motor.

Figure 4:
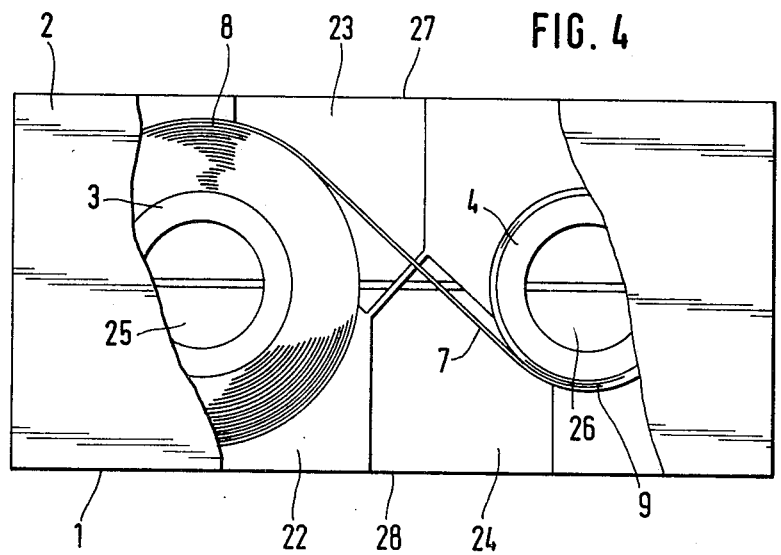
FIG. 4 is a schematic view illustrating the cassette removed from the drive system of the apparatus, partly broken away to show the interior construction.
Figure 5:
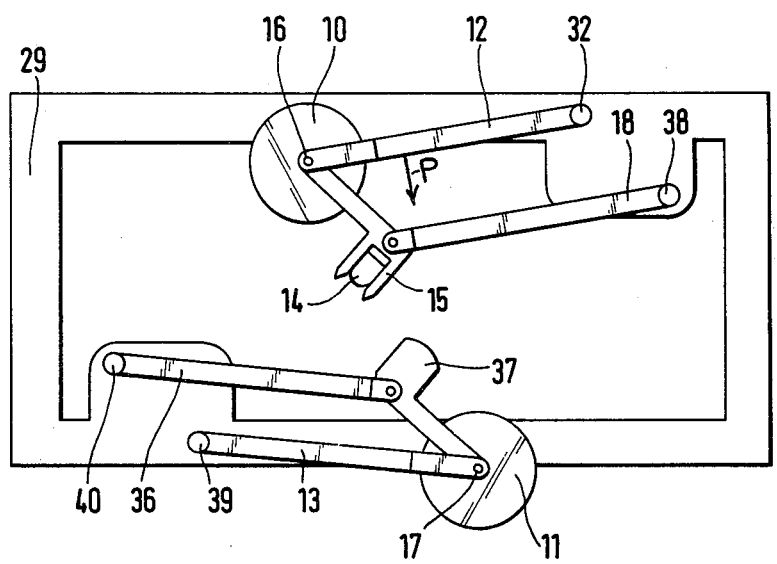
FIG. 5 is a top view of the linkage support arrangement for the dynamo electric machines within the transducing apparatus, and the transducing heads, with the cassette removed.

Both the drive roller 10 and the braking roller 11 are movable essentially radially with respect to the windings 3, 4, and can be moved out of engagement with the respective windings to interchange the tapes, or the cassettes or cartridges, respectively. The respective rollers 10, 11 are supported by links 12, 13 (FIGS. 1 and 5) on a frame 29 of the tape transport apparatus. Cassette 1 has openings 23, 24 in its end plates, as also seen in FIG. 4, which continue through the bottom plate 22 of the cassette, to permit introduction of the respective rollers 10, 11 and associated equipment into the region of the cassette where the tape runs between the wind-up and pay-out windings. Drive roller 10 and retardation or braking roller 11 can be engaged with the respective sides of the tape 7 at the windings by suitable springs, not shown, and forming part of the transport apparatus, hooked, for example, to links 12, 13 and to the frame 29.

In order to ensure accurate and reliable contact between the tape 7 and the magnetic transducer head 14 in any position of the tape with respect to the pay-out and wind-up windings 9, 8, the transducer head 14 is surrounded by a tape guide shoe 15 and is linked to a pivot 16 (FIGS. 3, 5) which also forms the axis of rotation of the roller 10. The transducer head 15 is supported in a parallel linkage arrangement by a lever 18 which is pivoted at pivot point 38 to the frame 29; lever 12 is pivoted at pivot point 32 to the frame 29.

The bearing 17 of the brake roller 11 is linked to a counter element 37 of the tape 7 which, in general, may have a shape similar to that of a recording head, but bearing against the back side of the tape, and providing a counter bearing for the tape to ensure proper guidance of the tape in its path between the pay-out and wind-up windings. The counter bearing 37 is coupled to the roller 11 by a linkage similar to that which secures the magnetic head 15, which is a parallel linkage arrangement including lever 36 pivoted at pivot point 40 on the frame 29. Lever 13 supporting the roller 11 is pivoted at point 39 to the frame 29. The element 37 provides for reliable and, if desired, increased engagment pressure of the tape 7 on the transducing head 14.

The drive roller 10, as well as the counter element 13, are so linked by means of the respective links 12, 18, in combination with the transducing head 14, or the counter element 37, respectively, that a wedge effect of the friction drive elements with respect to the tape is obtained. As the torque on the motor driving the roller 10 increases at the wind-up winding 3, the engagement pressure likewise increases since the roller 10 will wedge more tightly against the wind-up winding 8. Loading of the bearings is matched, however, to the respectively required torque at any diametrical position of the winding on the reel 3. This substantially improves the uniformity of tape transport and of winding on the take-up reel. The engagement force of the roller 10 is schematically indicated by arrow P in FIG. 5, and can be generated by a spring, not shown. A similar arrangement can be made with respect to the pay-out roller 11 in which, as the diameter of the pay-out roller decreases, the engagement force will decrease.

Figure 2:
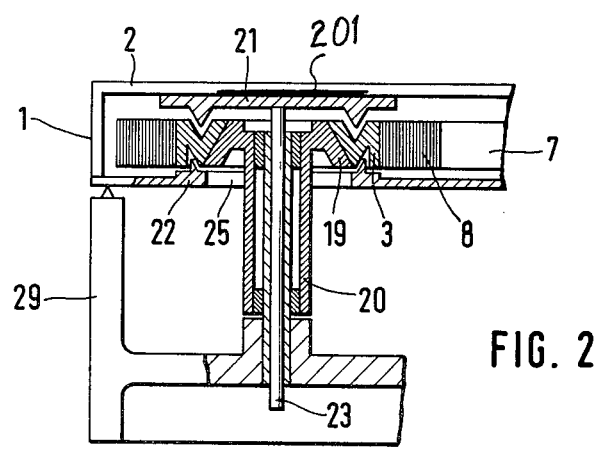
FIG. 2 is a schematic longitudinal part-sectional view, partly broken away, showing a fragment of the tape cassette associated with the apparatus and illustrating the braking arrangement for the tape and tape winding holder or reel.

The details of a cartridge winding holding arrangement are shown in FIG. 2. The cartridge or cassette 1 is shown in operating condition on the frame 29 of the transducing apparatus, not shown in greater detail. The take-up winding reel 3 has an inner conical seat which fits on a conical shaft projection 19 of a hollow shaft 20 which is journalled in the frame 29 by suitable bearings. A braking plate 21 is resiliently supported with respect to the top cover 2 of the cassette or cartridge 1 by an interposed spring 201 which, preferably, is a torsion spring. The braking plate 21, in operation, is lifted off the top of the reel 3 by a push rod 23, passing through the center of the hollow shaft 20 of the reel holder 19, to permit free rotation of the reel 3. The braking plate 21 is lifted off the reel 3 only when the apparatus is operative, for example by an electromagnetically operated plunger engaging the rod 23, by a solenoid, or the like, or by a camming arrangement coupled to the switching for the apparatus. When the transducing apparatus is stationary, rod or plunger 23 drops down, under force of the spring 201, and gravity, and plate 21 will engage the reel 3 and hold it in position.

Before the cassette or cartridge 1 is introduced on the transducing apparatus, the reel 3 is held by the braking plate 21 against the bottom surface 22 of the cassette or cartridge 1 by the spring 201, engaging the top plate 2 of the cassette or cartridge. Reel 4 is similarly maintained in positioned. Upon introduction of the cassette or cartridge 1 on the apparatus, the conical transport element 19 will seat within the reel 3 for accurate centering. The conical element 19, on the shaft 20, will lift the tape 3 off the bottom plate, FIG. 2 illustrating the slight clearance provided thereby. The reel 3 and the conical transport element 19 can be additionally engaged by suitable spring-loaded balls engaging, for example, matching depressions, and positioned on the element 19, as well known, to provide for accurate centering and positive engagement without slippage for smooth running of the reel 3 about the axis of rotation of the hollow shaft 20, as defined by its bearings. The pay-out reel 4 is similarly lifted off the bottom of the cassette 1.

The springs 201, preferably, are so arranged that they provide not only vertically extending forces between the covers 2 and 22 of the cassette or cartridge 1 (with reference to FIG. 2) but additionally provide torsional forces to the pay-out and take-up windings or reels, thereby ensuring that the tape 7 is always in stretched condition in its path between the two windings 8, 9. Springs 201, preferably, are either spiral springs or leaf springs, which additionally provide for torsional or rotational forces, similar to lock washers.

Centering of the windings within the cassette or cartridge, and particularly when the cassette is removed from the apparatus, is improved by forming the reels with circumferential grooves which match circumferential ring-shaped projections formed in the bottom 22 of the cartridge and on the braking plate 21, as seen in FIG. 2.

Figure 3:
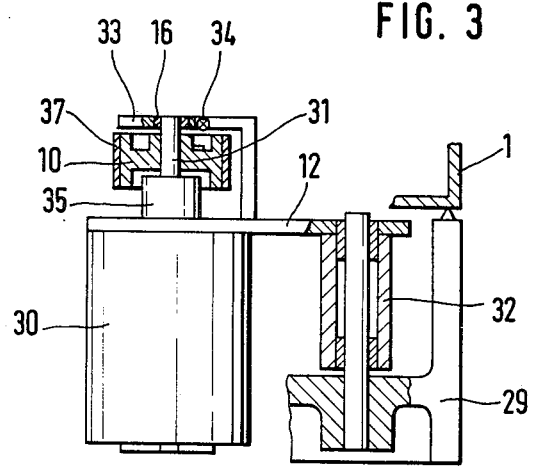
FIG. 3 is a highly schematic vertical view, partly in section, and showing the association of a dynamo electric machine, for example a drive motor, with a drive roller to drive the tape through the cassette.

FIG. 3 illustrates a dynamo electric machine 30, connected as a motor and drive roller 10 coupled to the operating shaft 31 of motor 30. Motor 30 is rigidly secured to a link arm 12 which, in turn, is journalled on bearing 32 on the frame 29 of the apparatus. Link 12 is formed with a bearing arm 33 extending over the roller 10 and securing the upper portion of shaft 31 to ensure true running. The arm 33 additionally carries a photoelectric speed transducer 34 which can be electrically connected to the motor 30 to control its speed of operation to be precisely uniform, as well known in connection with tape transport motor drives. The photoelectric transducer can cooperate, for example, with markings formed on the drive roller 10. The drive roller 10 has an elastic surface 37. The magnetic transducer head 14 is preferably attached by a pivot connection to the stub or boss 35 formed on the motor housing 30 or on the link 12, respectively, to form the pivot connection 16, while providing for centering of the connecting arm from the transducer head 14 with respect to the center of rotation of the drive roller 10.

The cassette itself is simple; FIG. 4 illustrates the cassette, partly broken away, with tape windings therein, and showing the tape path. The openings in which the respective drive rollers can engage are clearly seen. The tape 7 extends in a diagonal path with respect to a line connecting the centers of rotation of windings 8, 9. The bottom plate 22 is formed with the openings 23, 24 for the drive roller 10 and the braking roller 11, 12, respectively, as well as with openings 25, 26 for the conical shaft supports 19 (FIG. 2). Cover plates 27, 28 which, for example, are longitudinally slidably located in the cassette or connected thereto by "living hinge" connections are provided to close off the openings 23, 24 and 25, 26 so that the cassette will be closed and the contents thereof protected against contamination when not in use.

The supports for the drive rollers 10, 11, with axes of rotation 16, 17, connect the respective rollers 10, 11 with the links 12, 13 which, in turn, are connected at pivot points 32, 39 to the chassis frame 29. The transducer head 14 and the tape guide element 15 thereof are connected by the further link 18 with the frame 29. The arrangement of the respective pivot points is so made that the drive roller 10 and the transducing head 14 with its tape guide 15 provide a parallel linkage arrangement. Likewise, the retardation of braking roller 11 is connected to the counter element 13 which, in turn, is connected by a linkage 36 to pivot point 40 on the frame 29 so that, again, the links 13, 36 and the respective pivot points form a parallel-linkage arrangement.

The system and apparatus is particularly suitable for information recording and reproduction in which magnetic signals are transduced for use in television recording, the signals being recorded in longitudinal track recording arrangement, in parallel tracks, and the feed of the tape is reversed when it has reached its final end, that is, when the pay-out reel has paid out the entire tape wound thereon. The dynamo electric machines coupled to the rollers 10, 11 can be readily so connected that they function either as drive motors, with an accurate speed control system connected, or as generators with a dissipating resistor, thus operating as a dynamic brake. The cassette or cartridge holding the tape is simple, readily made of transparent plastic material, while providing for reliable guidance of the tape between the respective pay-out and take-up windings.

Various changes and modifications may be made within the scope of the inventive concept.

I claim:

1. Tape transducing system comprising
a support frame (29);
a take-up winding (8) and a pay-out winding (9), said windings being located adjacent each other and having centers of rotation fixed with respect to the frame;
drive means (10, 30) in engagement with the tape take-up winding (8) comprising a drive roller (10) in engagement with the take-up winding (8) and engaging the tape at one side thereof, rotating the take-up winding in a first take-up direction;
retardation means (11) in engagement with the pay-out winding (9) comprising a brake roller (11) in engagement with the pay-out winding (9) and engaging the tape (7) at the side opposite the side at which the drive roller is engaged, and applying a braking or retarding tension on the tape, while permitting rotation of said pay-out winding (9) in a direction opposite to that of the direction of rotation of the take-up winding (8);
support link means (12, 13) movably secured to the support frame (23) and supporting the respective drive roller and brake roller means for mutually parallel and radial movement with respect to the associated winding;
said windings, upon rotation in opposite directions, transporting tape in a path which is diagonal with respect to a tangential line connecting the circumferences of said windings;
a transducer head (14, 15) being located intermediate the windings and on the diagonal portion of the transport path;
and head support means (12, 16, 18) movably supporting the transducer head with substantially perpendicular orientation with respect to the tape, said head support means being coupled to the axis of rotation of the respective roller and moving in parallel therewith as the diameters of the respective winding change in operation, and the tape position in the transport path changes as tape is wound from the pay-out winding unto the take-up winding.

2. System according to claim 1, wherein the drive means and the retardation means comprise dynamo electric machine means each, the dynamo electric machine means of the drive means being connected to operate as a motor, and the dynamo electric machine means of the retardation means being connected as a dynamic generator-brake.

3. System according to claim 1, wherein the drive means (10, 30) and the retardation means (11) are movable with respect to the centers of rotation of the respective windings in essentially radial direction and essentially parallel with respect to each other.

4. System according to claim 1, wherein the drive means and the retardation means, respectively, are mounted on said support frame for removing or clearing movement with respect to the respective winding.

5. System according to claim 1, wherein the head support means comprises a parallelogram link connection with one of said drive means or retardation means respectively.

6. System according to claim 5, wherein the parallelogram link connection includes a guide link (18) connecting the transducer head and the frame and essentially parallel to the support link means of the respective drive means or retardation means (10, 11), respectively, to provide for a parallel-linkage arrangement (32-12-16-14-18-38) of support of the transducer head.

7. System according to claim 1, further including a winding holding reel (3, 4) associated with the respective windings (8, 9) for winding said windings thereon; support means (19, 20) journalled in said support frame (29) for said reels, said support means and said reels being formed with interengaging matching conical projection-recess engagement seats, the rotatable support means comprising a hollow shaft (20) supporting the conical portion thereon for engagement with the matching conical portion of the respective reel.

8. System according to claim 7, further including a cassette or cartridge (1) retaining the reels (3, 4) for the respective take-up winding (8) and pay-out winding (9); a brake plate located within said cassette or cartridge and in axial alignment with at least one of said reels (3, 4), spring means (201) interposed between said brake plate and a wall (2) of the cassette and resiliently pressing the respective reel against the opposite wall (22) of the cassette; and controlled plunger means (23) engageable with said brake plate (21) to release engagement of the brake plate with the respective reel and counter resilient spring force tending to hold the brake plate (21) in engagement with the reel (3, 4).

9. System according to claim 8, wherein the plunger means extends through the hollow shaft (20).

10. System according to claim 8, wherein said cassette comprises a top wall (2) and a bottom wall (22), said top and bottom walls being formed with respective openings (23, 24) therein of sufficient size to receive said drive means and said retardation means for engagement with the tape adjacent the respective winding, and to receive the transducing head and the head support means therefor.

11. System according to claim 10, further including additional openings concentric with said reels (3, 4) to receive the shaft portions engageable with said reel.

12. System according to claim 10, further comprising closure flaps (27, 28) on said cassette to permit closing off said openings.

13. Tape transducing system comprising
a support frame (29);
a take-up winding (8) and a pay-out winding (9), said windings being located adjacent each other;
a magnetic tape tranducer head (14, 15) located in the path of the tape transport between the windings,
drive means (10, 30) in engagement with the tape take-up winding (8);
retardation means (11) in engagement with the pay-out winding (9),
said windings being rotatable in opposite directions and transporting tape in a path which is diagonal with respect to a line connecting the centers of rotation of said windings, said center of rotation being fixed with respect to the support frame (29);
the transducer head (14, 15) being located intermediate the windings and on the diagonal portion of the transport path;
head support means (12, 16, 18) movably supporting the transducer head with substantially perpendicular orientation with respect to the tape, as the tape position in the transport path changes upon change of the size of the respective windings as tape is wound from the pay-out winding unto the take-up winding;
a winding holding reel (3, 4) associated with the respective windings for winding said winding thereon;
a cassette or cartridge (1) retaining the reels (3, 4) for the respective take-up winding (8) and pay-out winding (9);
support means (19, 20) journaled in said support frame (29) for said reels, said support means and said reels being formed with interengaging matching engagement seats;
a brake plate located within said cassette or cartridge and in axial alignment with at least one of said reels (3, 4), spring means (201) interposed between said brake plate and a wall (2) of the cassette and resiliently pressing the respective reel against the opposite wall (22) of the cassette;
and controlled plunger means (23) engageable with said brake plate (21) to release engagement of the brake plate with the respective reel and counter the resilient spring force tending to hold the brake plate (21) in engagement with the reel (3, 4).

14. System according to claim 13, wherein the plunger means extends through a hollow shaft forming the support means.

15. System according to claim 13, wherein said cassette comprises a top wall (2) and a bottom wall (22), said top and bottom walls being formed with respective openings (23, 24) therein of sufficient size to receive said drive means and said retardation means for engagement with the tape adjacent the respective winding, and to receive the transducing head and the head support means therefor.

16. System according to claim 15, further including additional openings concentric with said reels (3, 4) to receive the shaft portions engageable with said reel.

17. System according to claim 15, further comprising closure flaps (27, 28) on said cassette to permit closing off said openings.

* * * * *